UNITED STATES PATENT OFFICE.

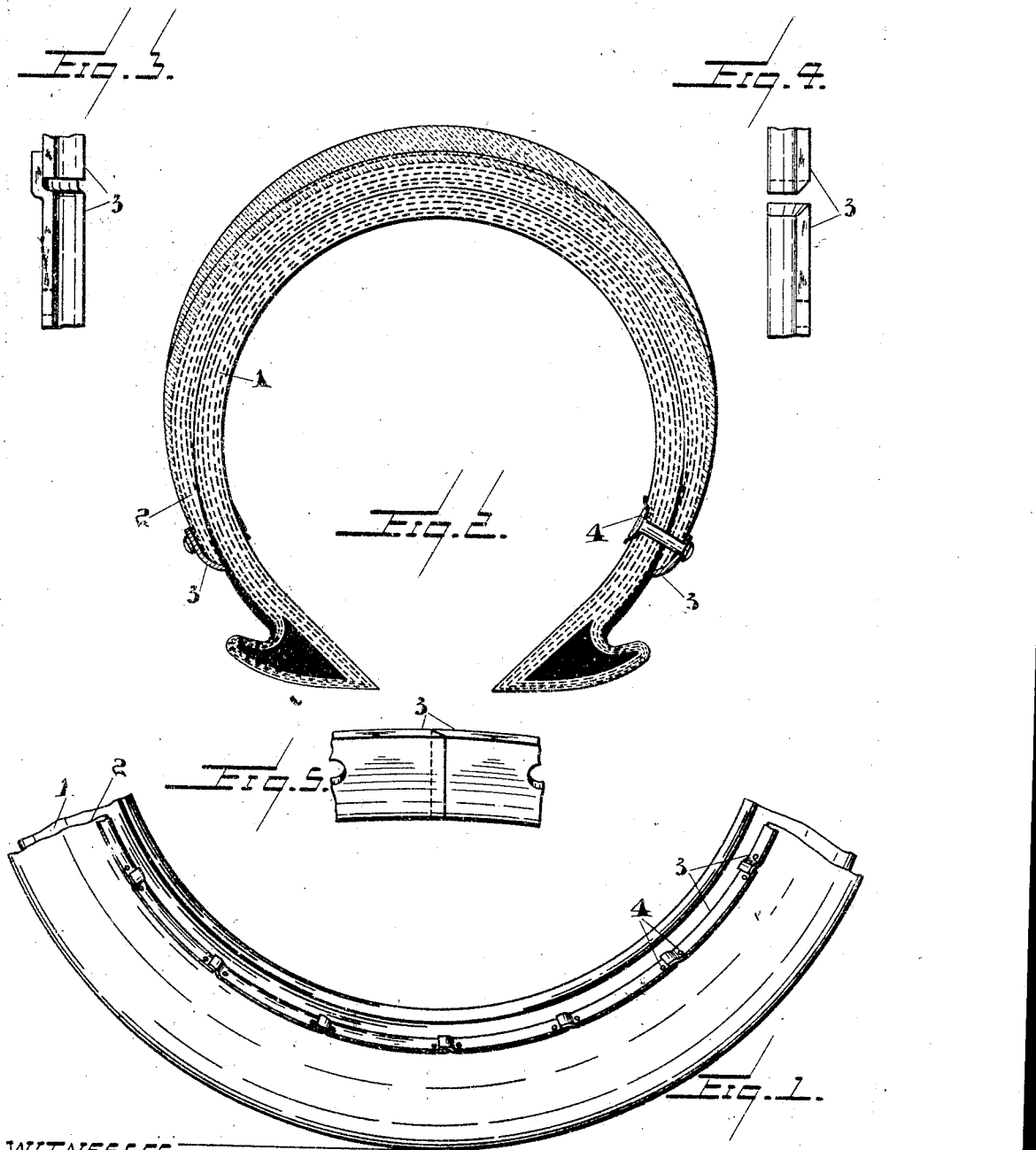

JAMES E. HAINES, OF TORONTO, ONTARIO, CANADA, ASSIGNOR TO ANNIE A. HAINES, OF TORONTO, ONTARIO, CANADA.

PNEUMATIC TIRE.

1,233,464.   Specification of Letters Patent.   Patented July 17, 1917.

Application filed December 28, 1916. Serial No. 139,361.

*To all whom it may concern:*

Be it known that I, JAMES E. HAINES, of the city of Toronto, in the county of York, Province of Ontario, Canada, have invented certain new and useful Improvements in Pneumatic Tires, of which the following is a specification.

This invention relates to constructions whereby tires with worn out treads can be repaired by applying new treads thereto, and particularly treads of other covers discarded owing to their having become rim cut, and my object is to devise means for securing the treads in place which will be absolutely secure, which will not interfere with the flexing of the cover, which will be neat in appearance, and which will adequately protect the edges of the tread from dirt and water.

I attain my objects by means of the constructions hereinafter described and as illustrated in the accompanying drawings in which—

Figure 1 is a side elevation of part of a tire constructed in accordance with my invention;

Fig. 2 a cross section of the same on an enlarged scale;

Figs. 3 and 4 details in plan showing different constructions of the overlapping ends of the parts of the annular clamping rings; and Fig. 5 a side elevation showing the overlapping ends of adjacent plates of an annular clamping ring.

In the drawings like numerals of reference indicate corresponding parts in the different figures.

1 is a tire cover which has preferably been stripped of its rubber tread, 2 is a tread from which the rim-engaging edges have been cut away. This tread is carefully cemented to the cover 1 and its edges are further secured by means of sectional clamping rings such as hereinafter described. Preferably the edges of the tread are reduced in thickness and chamfered as shown. This not only improves the appearance of the completed tire, but also better adapts the edges for the application thereto of the clamping rings.

3, are the plates which form the sections of the clamping rings. Each plate in cross section is bent from the flat so as to cover not only part of the side of the tread member, but its edge as well. Preferably the curved form shown is employed. It is desirable to have the clamping rings practically continuous so that the clamping action is applied to all parts of the surface of the tread member to which the rings are applied. I therefore overlap the ends of the segments and either offset one end as shown in Fig. 3 or bevel both as shown in Fig. 4, so that the thickness at the joint is not increased. In either case a substantially continuous contact of the clamping ring with the surface beneath it is obtained.

The clamping rings are secured in place by means of rivets 4 or any other suitable means, the rivets passing through the plates, tread and cover, thus firmly securing the edges of the tread to the cover. Owing to the joints between the sections of the rings, the rings may yield in any manner necessary to permit of the continuous deformation of the tire which occurs when the tire is in use on a wheel.

What I claim as my invention is:

1. In a pneumatic tire, the combination of a tire cover; a tread member fitted to the cover and extending down and over the sides of the cover; a series of contacting plates forming a clamping ring at each side of the tire shaped in cross section to cover the edge and part of the side of the tread member at each side, the ends of the plates overlying one another; and means passing through the cover, tread and plates securing them together.

2. In a pneumatic tire, the combination of a tire cover; a tread member fitted to the cover and extending down and over the sides of the cover; a series of plates forming a clamping ring at each side of the tire shaped in cross section to cover the edge and part of the side of the tread member at each side, the ends of the plates being overlapped and one end offset to pass behind the adjacent end of the next plate; and means passing through the cover, tread and plates securing them together.

3. In a pneumatic tire, the combination of a tire cover; a tread member fitted to the cover and extending down and over the sides of the cover; a series of plates forming a clamping ring at each side of the tire, the ends of the plates being overlapped and one end offset to pass behind the adjacent end of the next plate; and means passing through the cover, tread and plates securing them together.

Signed at Toronto this 18th day of December A. D. 1916.

JAMES E. HAINES.